Figure 4:
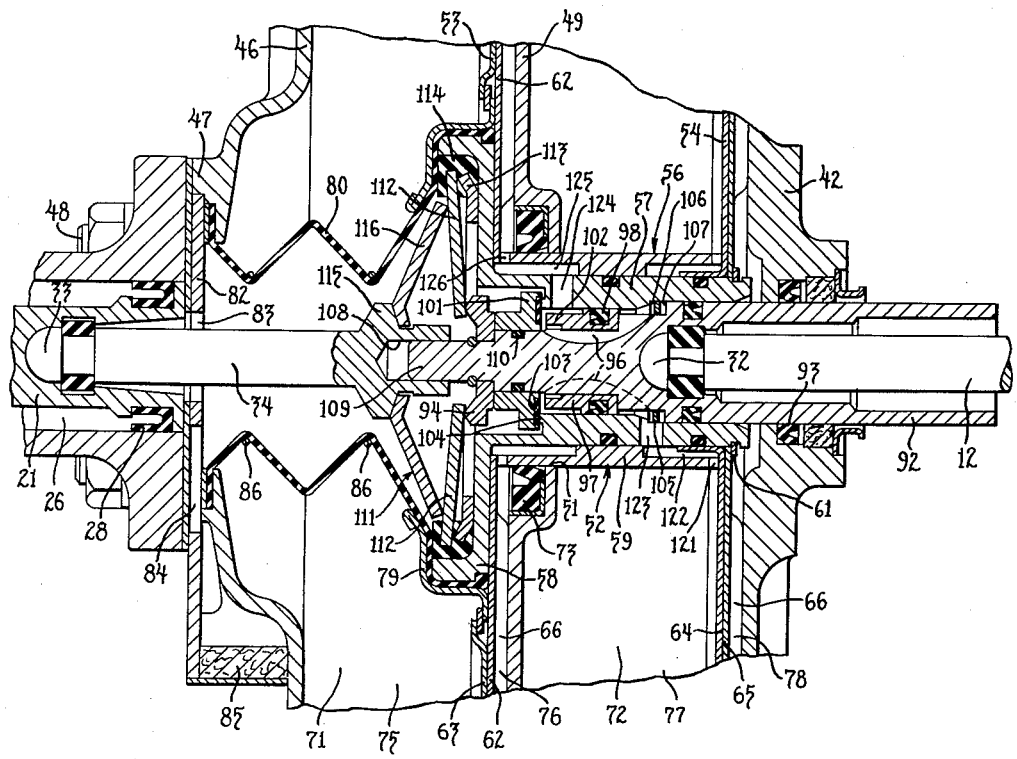

Dec. 19, 1961  F. O. E. SCHULTZ  3,013,537
BOOSTER BRAKE MECHANISM
Filed Oct. 19, 1959  2 Sheets-Sheet 1
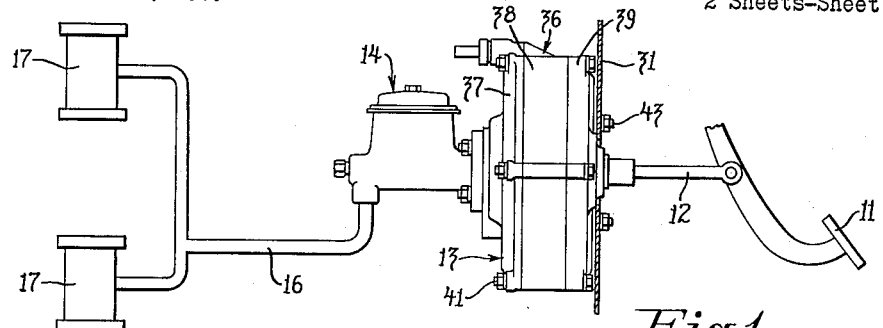
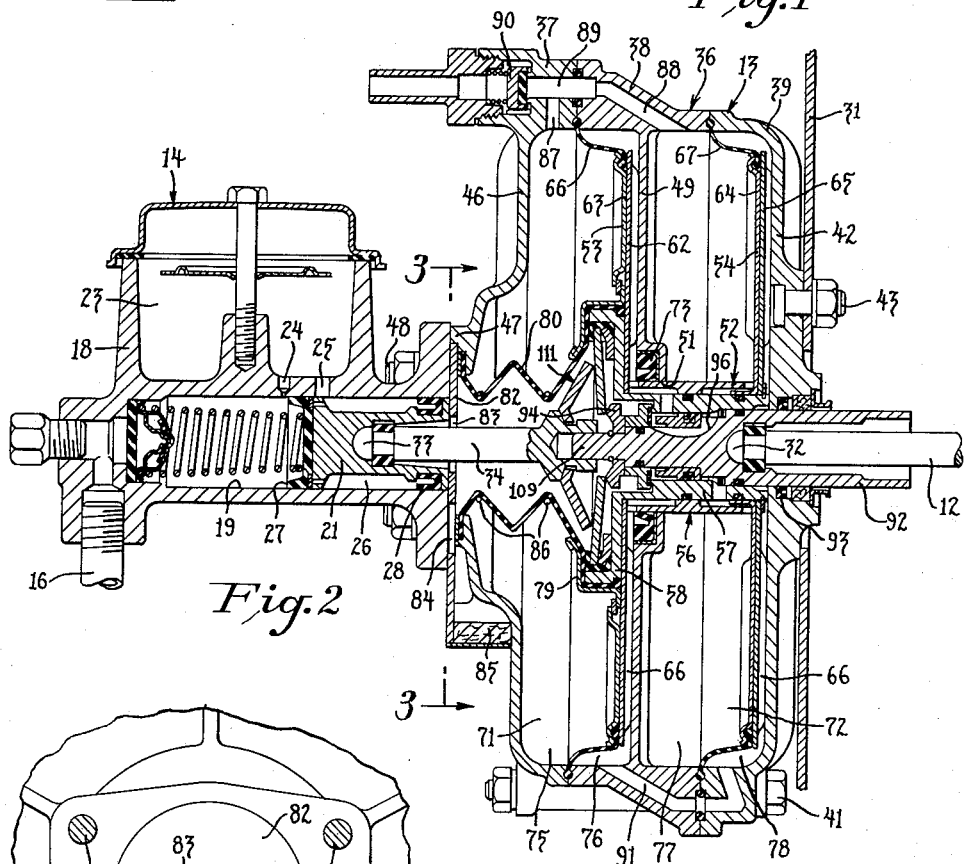
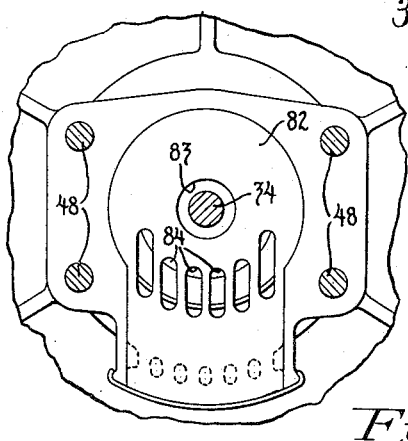
INVENTOR.
FORREST O. E. SCHULTZ
BY
Irvin L. Groh
ATTORNEY.

Dec. 19, 1961   F. O. E. SCHULTZ   3,013,537
BOOSTER BRAKE MECHANISM
Filed Oct. 19, 1959   2 Sheets-Sheet 2

INVENTOR.
FORREST O. E. SCHULTZ
BY
*Irvin L. Groh*
ATTORNEY.

United States Patent Office 3,013,537
Patented Dec. 19, 1961

3,013,537
BOOSTER BRAKE MECHANISM
Forrest O. E. Schultz, Owosso, Mich., assignor to Midland-Ross Corporation, Cleveland, Ohio, a corporation of Ohio
Filed Oct. 19, 1959, Ser. No. 848,490
5 Claims. (Cl. 121—41)

This invention relates to booster brake mechanism and more particularly to vacuum suspended booster mechanisms used with hydraulic master cylinders of vehicle brake systems. This application is a continuation-in-part application of my original application Serial No. 764,712, filed October 1, 1958 and since abandoned.

Automobiles are usually made available either with hydraulic brakes or with power brakes which incorporate a booster mechanism for actuating the hydraulic brakes. Both types of systems utilize a master cylinder but in each case the master cylinder is different. The master cylinder used with hydraulic brakes is ordinarily provided with a single seal to prevent fluid from leaking to the atmosphere. The booster or power type brake uses a special master cylinder which incorporates a complex seal means to prevent the vacuum in the booster from sucking or bleeding hydraulic liquid from the basic brake system. The latter type of arrangement is unsatisfactory since the seal means is expensive and seldom adequate. Furthermore, the additional seal means frequently embodies three or more seals and increases the friction to the point where it seriously detracts from the smooth operation of the power brake. In addition to this, the automobile manufacturer must provide for at least two types of master cylinders which adds to the problems of manufacture and results in additional expense to the purchaser.

Another problem in the manufacture of a booster is a need for return springs to move the power piston to its initial position after a power application. This not only adds to the cost of the booster but presents problems of assembly.

It is a general object of the invention to provide a booster in which the mechanism is greatly simplified by utilizing fluid pressure to eliminate the need for return springs and certain fluid sealing means.

Another object of the invention is to provide a booster mechanism in which novel means are provided to isolate the seal of a conventional master cylinder attached to the booster from vacuum pressure and subject it to atmospheric pressure so that liquid leakage from the master cylinder is avoided without the necessity of adding seals.

It is still another object of the invention to provide a booster which may be disposed between the conventional master cylinder of a hydraulic brake system and the manual actuating means for the master cylinder, such as a pedal actuator rod, without modifying any portion of the brake system or actuating linkage.

Still another object of the invention is to provide a booster of the above type in which the means for balancing pressures on the seals acts as an air conveying means to supply relatively high pressure to a valve controlling actuation of the booster.

Another object of the invention is to provide a brake booster which eliminates the need for return springs by a novel arrangement of parts which creates a pressure differential effective to return the power piston to its original position.

The foregoing and other objects and advantages are attained by the present invention, various novel features of which will be apparent from the following description and from the accompanying drawings disclosing a preferred embodiment of the invention.

Referring to the drawings:
FIG. 1 is a diagrammatic representation of a hydraulic brake system incorporating a booster mechanism embodying the present invention;
FIG. 2 is an enlarged, cross-sectional view of a booster and an attached master cylinder, such as shown in FIG. 1;
FIG. 3 is a cross-sectional view taken on line 3—3 in FIG. 2;
FIG. 4 is a cross-sectional view of a portion of the mechanism shown in FIG. 2 but at an enlarged scale; and
FIG. 5 is a view similar to FIG. 1 showing the arrangement of parts when a booster is not used.

As shown in FIG. 1, a power brake system incorporating the present invention includes the usual swinging foot pedal 11 which is used to transmit movement to a rod 12 for actuating a fluid motor or booster 13 in a manner to be more specifically described later. When actuated, the booster applies force to a piston in the hydraulic master cylinder 14 which in turn forces fluid through lines 16 to conventional type brake actuators 17 located at the wheels of a vehicle. In the usual hydraulic brake system, as illustrated in FIG. 5, the rod 12 transmits movement directly from the pedal 11 to the master cylinder 14 without the aid of a booster.

Referring to FIG. 2, the master cylinder 14 is illustrative of the type in common use on American automobiles to actuate hydraulic brake systems and a detailed description of construction and operation is not necessary for an understanding of the invention. The master cylinder includes a housing 18 having a bore 19 slidably receiving a piston 21 which is used to force hydraulic fluid under pressure through lines 16 to the brake actuators 17. The housing 18 incorporates the usual fluid reservoir 23 formed above the bore 19. The reservoir is used to maintain the entire hydraulic brake system full of fluid by way of the restricted passage 24. The reservoir also communicates through an opening 25 with an annular chamber 26 formed about the master cylinder piston 21 between a high pressure seal 27 and a low pressure seal 28. The chamber 26, like the reservoir 23, normally contains liquid in the form of hydraulic fluid at atmospheric pressure.

Figure 5:
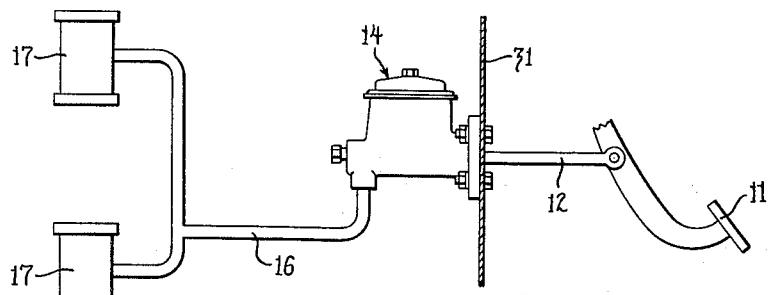

In conventional hydraulic systems, as shown in FIG. 5, the master cylinder 14 is usually mounted on the partition wall or firewall 31 which divides the passenger compartment from the engine compartment in an automobile. In this position, the master cylinder is properly located to receive the forward end portion 32 of rod 12 (FIG. 2). When the master cylinder 14 is used in a power brake system, as shown in FIG. 1, it is mounted on the booster 13 to receive the forward end portion 33 of the booster rod 34.

The booster 13 comprises a housing 36 made up of separable parts 37, 38 and 39 which are held together by means of bolts 41. Housing part 39 forms a rearward wall 42 which is secured to the firewall 31 in the position normally occupied by the master cylinder 14 through means of bolts 43. The housing part 37 forms a forward wall 46 which presents a mounting portion 47 for receiving the rearward or open end of the master cylinder 14. The master cylinder is rigidly secured in position on the booster 13 through bolt means 48.

The housing is divided by a stationary wall 49 formed integrally with the housing portion 38 and is provided with an opening 51 which slidably supports a double piston or wall unit designated generally by the reference character 52. The piston assembly comprises a pair of movable walls 53 and 54 rigidly connected to the opposite ends of a valve housing 56. The movable walls 53 and 54 and the valve housing 56 move as a unit but for manufacturing purposes, the assembly is made up of a number of parts. More specifically, and as best shown in FIG. 4, the valve housing 56 includes a generally tubular member 57 having a flanged portion 58 at its forward end. A second tubular member 59 fits over the tubular member 57 and opposite ends engage walls 53 and 54 to hold them in spaced relation on the valve housing between the flange 58 and a snap ring 61. The tubular members 57 and 59 make it possible to provide a number of fluid conveying passages to which reference will be made later.

The movable wall 53 is made up of a plate 62 rigidly connected to a ring 63 and the movable wall 54 is formed by plate 64 rigidly connected to another plate 65. A ring-shaped diaphragm 66 has a bead at its inner circumference clamped between plates 64 and 65. Beads at the outer circumference of the diaphragms 66 and 67 are clamped between the housing portions 37, 38 and 39. The plates 62 and 65 are provided with a plurality of ribs 66 which act to reinforce the walls 53 and 54 and also engage the walls 42 and 49 of the housing to limit rearward movement of the piston unit 52.

The stationary wall 49 divides the interior of the housing 36 into a forward compartment 71 and the rearward compartment 72. To maintain the compartments isolated from each other, a seal 73 is mounted adjacent the opening 51 in the wall 49 so that it slides relative to the outer surface of the valve chamber 56. Each of the housing compartments 71 and 72 are divided into a pair of pressure chambers by the movable walls 53 and 54 and the diaphragms 66 and 67. The forward housing compartment forms a constant pressure chamber 75 at the forward side of the wall 53 and a variable pressure chamber 76 at the rearward side of the wall. The rearward housing compartment 72 is divided into a constant pressure chamber 77 forward of wall 54 and a variable pressure chamber 78 rearward of the wall.

As best seen in FIG. 4, wall means in the form of a tubular member or bellows 80 is made of resilient material and is disposed in the forward part of the housing with its rearward end clamped against the flange 58 by means of a dished ring 79 held in position by plate 62 and ring 63. The forward end of the bellows 80 is clamped between the mounting portion 47 and a plate 82. The plate has an opening 83 which communicates with the interior of the bellows and, consequently, with the valve chamber member 56. The plate 82 is provided with a plurality of slots 84 (FIG. 3) which place the opening 83 and the interior of the bellows in communication with the atmosphere through a filter type breather 85. The bellows is resilient and permits movement of the piston means without interference. During such movement, the interior of the bellows forms a cylindrical compartment which remains in constant communication with the atmosphere and acts as a constant, high pressure supply chamber. Since the annular chamber 75 exterior of the bellows is at vacuum pressure and the interior of the bellows is at atmospheric pressure, rings 86 are placed around the bellows 80 to prevent the latter from expanding due to the pressure differential.

The constant pressure chambers 75 and 77 communicate with each other through passages 87 and 88 connected to a passage 89, all of which are formed in the outer circumference of the housing 36. The passage 89 communicates with a vacuum source such as the intake manifold (not shown) on a vehicle engine.

A check valve 90 is disposed in the passage 89 and is operative to open whenever the pressure in the chambers 75 and 77 is higher than the pressure from the vacuum source. If the vacuum source should fail due to a leak or when the vehicle engine stops, the check valve will close to trap vacuum pressure in the chambers 75 and 77. The trapped vacuum pressure is available for at least one actuation of the booster after the vacuum source has failed.

The variable pressure chambers 76 and 78 are maintained in constant communication with each other by means of passage 91 formed in the parts 38 and 39 at the outer circumference of the housing 36.

A manually operable member or valve guide 92 is supported in the rear wall of the housing 36 for sliding movement within the valve chamber 56. A seal 93 prevents leakage between the housing and the guide 92. The valve guide is made up of a number of parts but for all practical purposes it may be considered as a unit. The forward portion of the valve guide is reduced in diameter and is fitted with a collar 94 and an intermediate portion of the valve guide has a plurality of axially extending slots 96 over which a collar 97 is fitted. The collar 97 is provided with a groove for receiving a seal 98 which acts against the inside diameter of the valve housing 56. The slots 96 afford a passage means to permit fluid pressure to communicate with opposite sides of the seal 98. The rearward portion of the valve guide 92 is hollow to receive the forward end 32 of rod 12.

A valve element 101 is mounted for sliding movement on the valve guide 92 between the stop or collar 94 and an annular valve seat 102 formed on the collar 97. The valve 101 is provided with a resilient ring 103 which is relatively wide so that it can engage both the valve seat 102 and an annular valve seat 104 formed on the valve housing 56 concentric with the valve seat 102. When the valve element 101 is engaged with the valve seat 104, which may be considered as a high pressure valve, the variable pressure chambers 76 and 78 are isloated from the atmospheric pressure chambers formed by the bellows 80. When the valve seat 102, forming a low pressure valve, is closed by the valve element 101, the vacuum pressure chambers 75 and 77 are isolated from the variable pressure chambers 76 and 77.

A seal 110 is seated in a slot formed in the valve guide 92 to engage the valve element 101 and prevent fluid leakage when either the high or low pressure valves are closed.

A spring 105 in the form of a wave washer is disposed between shoulders 106 and 107 on the valve guide 92 and the valve housing 56, respectively. The spring serves to urge the valve guide rearwardly relative to the wall assembly 52 and in so doing, the collar 94 rigidly connected to the valve guide 92 engages the valve element 101 and urges it into engagement with the valve seat 104.

The booster rod 34, which has an end portion 33 engaging the master cylinder piston 21, has a hollow end portion 108 which slidably receives the reduced end portion 109 of the valve guide 92. Movement of the valve guide 92 and the piston or wall assembly 52 is transmitted to the rod 34 through a connection afforded by a lever assembly generally designated by the reference character 111. The lever assembly includes a plurality of radially disposed levers 112 having their outer radial edges held to a ring 113 by a resilient rubber ring 114. A dished shaped ring 116 is adapted to be seated on the rod 34 with its outer diameter engaging intermediate portions of the radial levers 112 and with its inner diameter engaging a projection 115 on the rod 34. The lever assembly 111 is effective to connect the valve guide 92, the rod 34 and wall or piston unit 52 so that movement of any one of the parts results in positive movement of one or both of the other parts.

*Operation*

In the relative positions of the parts shown in FIGS. 2 and 4, the booster is in its released position, that is, the brakes of the vehicle are released. The chambers 75 to 78 are at the same subatmospheric pressure and are isolated from the atmospheric pressure available in the bellows 80. Under these conditions, the power unit 52 is at its extreme right position in the housing 36. The spring 105 urges the valve guide 92 to the right relative to the piston unit 52 so that the collar 94 engages the valve element 101 and maintains it in engagement with the valve seat 104. Since the valve seat 102 is formed integrally with the valve guide 92, it is positioned out of engagement with the valve 101. This permits the constant pressure or vacuum 77 to communicate with the variable pressure chamber 76 through radial passages 121, annular chamber 122, radial passages 123, slots 96, between valve element 101 and valve seat 102, through a radial passage 124, annular chamber 125 and radial passages 126. Since the variable pressure chambers 76 and 78 are in constant communication with each other and since the constant pressure chambers 75 and 77 communicate with each other, the communication through the valve passages maintains the chambers 75 through 78 at vacuum pressure. If the atmospheric pressure within the bellows member is ignored, the pressures at opposite sides of the movable walls 53 and 54 are equal and the power unit 52 is held stationary. In the industry it is common to refer to such boosters as being vacuum suspended since the pressures at opposite sides of the piston units are at equal vacuum pressures when the booster is in a released or unapplied condition.

Power actuation of the brakes is accomplished by applying foot pressure to the pedal 11 to actuate the valve 101 so that a pressure differential is created on the walls 53 and 54. The pressure differential results in movement of the piston assembly 52 to the left. The manual force applied to the pedal 11 and the force due to movement of the piston assembly 52 are transmitted through the rod 34 to the hydraulic piston 21 to actuate the brakes.

Initial foot pressure at the pedal 11 is transmitted to the rod 12 and the valve guide 92 moves to the left. During such movement the valve element 101 is maintained in engagement with the annular valve seat 104 by differential pressure acting on the valve element 101. More specifically, the left side of the valve element is exposed to atmospheric pressure in the bellows 80 and the right side of the valve element is exposed to vacuum pressure. This results in a pressure differential which forces the valve element 101 to the right against the seat 104 and maintains it in that position until the annular valve seat 102 is engaged. At the same time that valve seat 102 approaches valve element 101, the collar 94 moves to the left and pushed against the inner ends of the radially extending levers 112. The outer ends of the levers 112 fulcrum about the annular edge of the stationary ring 113 so that intermediate portions of the levers 112 push against the dished ring 116, which in turn transmits movement to the rod 34. Movement of the rod 34 is transmitted to the piston 21 of the master cylinder. Such initial movement of the foot pedal 11 and the various parts of the booster is effective to transmit manual force from the rod 12 to the master cylinder 14. The initial application of manual force is effective to increase the pressure in the hydraulic circuits and the actuators 17 are initially energized to take up any slack that may exist in the brake mechanism at the wheels so that additional movement will result in application of the brakes.

As the valve seat 102 engages the resilient ring 103 formed on the valve 101, the valve is in its lapped position, that is, both of the valve seats 102 and 104 are closed so that the constant pressure chambers 75, 77, the variable pressure chambers 76, 78, and the interior of the bellows 80 are isolated from each other. Under these conditions, the booster is ready for actuation and any further movement of foot pedal 11 is effective to bring about a power actuation of the brakes.

Movement of the valve guide 92 to the left from the lapped position of the valve is effective to move the valve element 101 from the annular valve seat 104. As soon as separation of the valve seal 103 and the valve seat 104 occurs, atmospheric air within the bellows 80 passes between the valve 101 and the valve seat 104 and enters the passage 124 to the annular chamber 125 and through the radial passage 126 into the variable pressure chamber 76. From the variable pressure chamber 76, atmospheric air passes by way of the passage 91 to the other variable pressure chamber 78. This creates a pressure differential, that is, vacuum exists at the left of the movable walls 53 and 54 and atmospheric air pressure exists to the right of the movable walls. The effect of the pressure differential is to move the walls 53 and 54 to the left as viewed in FIG. 2. The movement of the walls is transmitted to the rod 34 through ring 113 acting on the radial levers 112 which now fulcrum about their inner ends on the collar 94 which may be considered as held against movement to the right by manual force on the pedal 11. Intermediate portions of the levers push against the outer circumference of ring 116 and move the rod 34. Such operation causes power application of the brakes, that is, the power pushes the rod 34 and the piston 21 of the hydraulic cylinder to force fluid to the brake motors 17. A portion of the power application is transmitted through the radial levers 112 rearwardly to the rod 12 and, consequently, to the pedal 11 so that the operator applying the brakes may sense the degree of brake application.

When the brakes have been applied to the necessary degree, movement of rod 12 is stopped and the differential pressure causes the walls 53 and 54 to assume a position in which the valve 101 engages both of the annular valve seats 102 and 104 so that the valve again is in a lapped position. Under these conditions, the constant pressure chambers 75 and 77 are at vacuum pressure and are isolated from the variable pressure chambers 76 and 78 which are at some greater pressure approaching atmospheric pressure. As long as foot pressure is maintained on the pedal 11, the brakes will remain in their applied position.

When the brakes are to be released from the applied position previously described, some of the manual effort applied to the pedal 11 is released. The hydraulic pressure which may be in the neighborhood of 1,000 p.s.i. acts on the piston 21 and urges it to the right together with the rod 34. With differential pressure holding the piston unit 52, the lever assembly 111 moves the valve guide 92 and the rod 12 to the right. Since the valve mechanism is in its lapped position just prior to release, initial movement of the rod 12 and the valve guide 92 to the right will open the vacuum valve 102, that is, the annular valve seat 102 will move from engagement with the valve 101. This will lower the pressure in chambers 76 and 78 and the double piston assembly 52 will be urged to the right due to hydraulic pressure acting to the right on the piston 21. If pedal movement is interrupted at some point before reaching the fully released position of the brakes, the double piston unit 52 will continue to move to the right relative to the stationary valve guide 92 so that the valve 101 again engages the annular valve seat 102 to put the valve in a lapped position. The pressure that remains in the variable pressure chambers 76 and 78 will be effective to maintain the brakes in a partially applied condition until the pedal 11 is fully released. Upon full release of the pedal 11, the rod 12 and valve guide 92 will again move to the right due to hydraulic pressure on the piston 21 and permit the vacuum valve 102 to open so that the variable pressure chambers communicate with the vacuum source until the pressure in all of the chambers 75 through 78 are equal. As the wall unit approaches its extreme right position the hydraulic pressure will be extremely low and may be insufficient to return the valve guide 92 to the right so that the seat 102 disengages from the valve element 101. The wave form spring 105 acting between the piston unit 52 and the valve guide 92 offers sufficient force to accomplish the desired final movement so that all of the valve parts return to their initial, fully released position relative to the piston unit 52 as illustrated in FIGS. 2 and 4.

The hydraulic pressure existing in the master cylinder at the time the brakes are applied is usually sufficient to return the piston unit 52 most of the way toward its initial position, but it is usually necessary to employ a return spring to insure the final movement. The use of such springs is avoided in the embodiment by using differential pressure acting on the piston unit 52. The necessary differential in pressure is created by the particular arrangement of the bellows 80 relative to the other components of the booster. This is apparent by considering FIG. 2 and the action of the pressures existing as piston unit 52 moves from the left and approaches its initial or released position. Hydraulic pressure will be at a minimum so that no force is applied to move the rod 34 to the right. The vacuum pressure in each of the chambers 75, 76, 77, 78 will be substantially equal. Consequently, the pressures acting on opposite sides of the wall 54 and diaphragm 67 have no effect or tendency to move the unit. The vacuum pressure existing in chamber 76 is opposed by both the vacuum pressure existing within the chamber 75 and by atmospheric pressure within the bellows 80 and consequently, the pressure at the left side of the wall 53 is greater than at the right side. The bellows 80 exposes an area of the wall 53 which is defined roughly by the average diameter of the bellows 80. This area is exposed to atmospheric pressure which is relatively high when compared with the vacuum pressure. Consequently, the effect of the vacuum pressure is negligible and atmospheric pressure in the bellows 80 is opposed by atmospheric pressure acting toward the left on the rod 12 and valve guide 92 over an area defined by the inner diameter of seal 93. This latter area is smaller than that defined by the bellows 80 and the differential in area results in a pressure acting to the left of wall 53 which moves the piston 52 toward the right and its initial position as shown in FIG. 2.

As previously mentioned, installation of the booster 13 in a conventional hydraulic brake system merely requires a dismounting of the master cylinder 14 from the firewall 31 so that the booster 13 may be secured in its place. The master cylinder is then replaced on the booster so the booster 34 engages the piston 21 and the rod 12 which previously actuated the master cylinder piston will engage the valve guide 92 to actuate the booster. This makes it possible to conveniently convert a conventional hydraulic brake system to a power brake system. Such a conversion has not been practical with prior art boosters because the seals of master cylinders used with boosters are ordinarily exposed to the vacuum pressure of the booster and there is a tendency for hydraulic liquid to leak or to be sucked into the booster. This is detrimental to operation and has a damaging effect on the various parts of the booster mechanism. Attempts have been made to prevent such leakage by using a plurality of seals, sometimes as many as four or five. However, this has not proved to be a satisfactory arrangement because the large number of seals increase the friction and since opposite sides of the seal are subject to different pressure, the degree of friction is increased even more and may vary so that operation becomes erratic and cannot be accurately predicted.

In the present embodiment this problem is avoided and use of a conventional master cylinder without the use of special seals is made possible because of the bellows 80 which is in constant communication with the atmosphere. Communication is provided from the bellows 80 through the opening 83 to the right side of the piston 21 in the master cylinder. Because of this, the right side of the low pressure seal 28 in the master cylinder is exposed to atmospheric air. Since the left side of the seal 28 is exposed to hydraulic liquid at atmospheric pressure, the pressures at opposite sides of the seal are balanced and liquid leakage will not be experienced. Furthermore, the pressures remain constant and as a consequence, the friction of the single seal remains relatively low and constant.

In the present booster, the bellows which maintains the desired pressure balance on the seal also affords means for conveying operating air, namely, atmospheric air, to a control valve where it is made readily available to operate a booster.

To summarize, a brake booster mechanism has been provided which eliminates the use of return springs by utilizing differential pressure to return the power or wall unit to its original position. Furthermore, the booster unit may be inserted between a conventional brake master cylinder and its manually operated actuating member. No modification of the master cylinder is required and the booster itself is simple and efficient. The problem of leakage is solved without the requirement of special seals and the problem of variable friction is avioded by eliminating the customary seals and balancing springs. The novel arrangement which makes this possible, makes a supply of atmospheric air readily available for operation of the booster without employing the usual conveying means which adds to the complexity of the structure and in many cases, adds to the friction resisting smooth operation of the brakes.

It should be understood that it is not intended to limit the invention to the above described forms and details, and that the invention includes such other forms and modifications as embraced by the scope of the appended claims.

It is claimed and desired to secure by Letters Patent:

1. In a differential pressure brake booster having a housing with a movable wall dividing said housing into a variable pressure chamber and a constant pressure chamber, a valve mechanism supported by said wall and being movable in response to movement of a manual member to admit pressure fluid to said variable pressure chamber and cause movement of said wall from a first position toward a second position, the combination of auxiliary wall means connected to said wall and to said housing to form a cylindrical compartment communicating with a source of high pressure and with said valve mechanism, said cylindrical compartment exposing a portion of said wall to relatively high pressure when said variable pressure and constant pressure chambers are at the same low pressure to return said wall from said second position to said first position.

2. In a fluid pressure brake booster of the type having a housing, a movable wall in said housing forming a variable pressure chamber at one side and a constant pressure chamber at the other side, valve means controlling the pressure in said variable pressure chamber, an input member for moving said valve means, and an output member connected to said wall for movement thereby, the improvement comprising auxiliary wall means connected to said housing and to said movable wall and forming a compartment in said constant pressure chamber, said compartment having constant communication with the atmosphere and with said valve means, said valve means being movable relative to said movable wall and said wall means to admit atmospheric air from said compartment to said variable pressure chamber to cause movement of said wall and normally being positioned to isolate opposite sides of said wall from each other and from the interior of said auxiliary wall means, said auxiliary wall means defining an area on said wall greater than the area of said input member to create a pressure differential acting on said wall in the direction of said variable pressure chamber when said valve means is in normal position and the pressures in said chambers are equal.

3. In a fluid pressure brake booster having a housing forming aligned openings receiving an input and output member, respectively, a movable wall in said housing disposed between said input and output members and supporting valve means operable by said input member to control differential pressure acting on said wall to move said output member in one direction, the improvement comprising a bellows member surrounding said output member and connected to said housing and to said wall to form a high pressure chamber constantly communicating with the atmosphere, said bellows exposing an area at one side of said wall greater than the area of said input member to high pressure creating a pressure differential urging said wall in the other direction.

4. A booster unit for a brake system having a housing, a movable wall in said housing, a generally cylindrical member connected to said housing and to one side of said wall to permit movement of the latter and forming a fluid supply compartment within said member communicating with the atmosphere, and a constant pressure chamber exterior of said member communicating with a source of vacuum pressure, said supply compartment and constant pressure chamber being disposed at one side of the movable wall, said movable wall forming a variable pressure chamber at the other side thereof, valve means disposed between said supply compartment and said variable pressure chamber and normally being disposed in a position to isolate said supply compartment and variable pressure chamber while maintaining said chambers in communication with each other, said cylindrical member defining an area on said movable wall to establish a differential pressure acting on the latter sufficient to move said wall in return direction when said valve means is in said position and the pressures in said chambers are equal.

5. A booster brake mechanism comprising a housing, an input member slidably supported in said housing and presenting an area exposed to the atmosphere, a movable wall disposed in said housing and coacting with the latter to form an annular power chamber around said input member and to one side of said wall, a cylindrical member connected to said housing and to the other side of said wall and forming a cylindrical chamber continuously communicating with the atmosphere and a second annular chamber continuously communicating with a source of vacuum, said cylindrical and second annular chambers being disposed at the other side of said wall, valve means supported in said wall and connected to said input member for movement thereby independently of said cylindrical member, said valve means being movable from a closed position to an open position to admit atmospheric air to said power chamber to create a pressure differential moving said wall in said one direction and being movable from an open position to a closed position to admit vacuum pressure to said annular chamber whereby atmospheric pressure in said cylindrical chamber on the other side of the wall creates a pressure differential effective to return said wall in the other direction.

References Cited in the file of this patent
UNITED STATES PATENTS

| | | |
|---|---|---|
| 1,687,047 | Trail | Oct. 9, 1928 |
| 1,765,760 | Duty et al. | June 24, 1930 |
| 1,878,944 | Lombard | Sept. 20, 1932 |
| 1,978,667 | Breese | Oct. 30, 1934 |
| 2,924,072 | Burwell | Feb. 9, 1960 |